United States Patent [19]

Röhm

[11] 4,243,236
[45] Jan. 6, 1981

[54] SPLIT-JAW LATHE CHUCK WITH ROTARY COUPLING MEMBERS

[76] Inventor: Günter H. Röhm, Heinrich-Röhm-Strasse 50, 7927 Sontheim, Fed. Rep. of Germany

[21] Appl. No.: 40,127

[22] Filed: May 18, 1979

[30] Foreign Application Priority Data

May 19, 1978 [DE] Fed. Rep. of Germany ....... 2821910

[51] Int. Cl.³ .............................................. B23B 31/14
[52] U.S. Cl. .............................. 279/110; 279/1 ME; 279/121; 279/123
[58] Field of Search ........... 279/110, 121, 1 R, 1 ME, 279/111, 112, 117, 123, 1 K

[56] References Cited

U.S. PATENT DOCUMENTS

| 1,052,087 | 2/1913 | Niedhammer | 279/121 |
| 1,864,423 | 6/1932 | Forkardt | 279/121 |
| 2,083,414 | 6/1937 | Wettig | 279/1 ME |
| 2,602,673 | 7/1952 | Deuring et al. | 279/1 ME |
| 2,917,314 | 12/1959 | Ponting | 279/1 K |
| 3,199,880 | 8/1965 | Blattry et al. | 279/121 |
| 3,606,364 | 9/1971 | Benjamin | 279/110 X |
| 3,656,773 | 4/1972 | Blattry et al. | 279/110 X |
| 3,682,491 | 8/1972 | Sakazaki et al. | 279/1 |
| 3,744,808 | 7/1973 | Hughes | 279/123 X |

FOREIGN PATENT DOCUMENTS

| 2052037 | 4/1972 | Fed. Rep. of Germany | 279/121 |
| 2736753 | 2/1979 | Fed. Rep. of Germany | 279/121 |
| 582343 | 11/1946 | United Kingdom | 279/117 |

*Primary Examiner*—William R. Briggs
*Attorney, Agent, or Firm*—Karl F. Ross

[57] ABSTRACT

A lathe chuck has a chuck body rotatable about a chuck axis and formed with a plurality of angularly spaced and radially extending inner guides receiving respective inner jaw parts and with a plurality of angularly spaced and radially extending outer guides receiving respective outer jaw parts. The inner jaw parts can be synchronously radially moved to open and close the chuck. Respective coupling members are provided between the inner jaw parts and the respective outer jaw parts and are rotational about respective coupler axes extending radially of the chuck axis between coupling positions engaging both of the respective parts and coupling same together for joint radial displacement and angularly offset decoupling positions permitting relative radial displacement of the respective parts. Locking elements are operatively engageable between the inner jaw parts and the chuck parts for blocking radial displacement of the inner jaw parts except when the respective coupling members are in the coupling positions. Thus unless all of the coupling members are in the coupling position the operator cannot close the chuck and start up the lathe.

9 Claims, 7 Drawing Figures

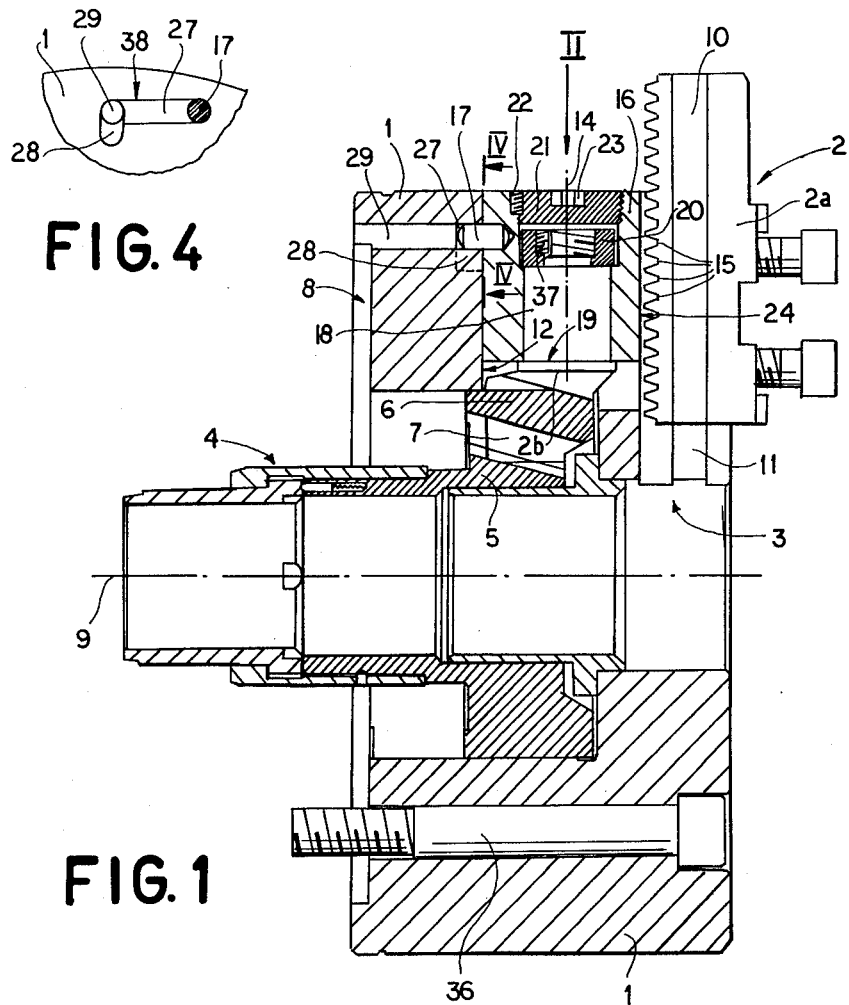
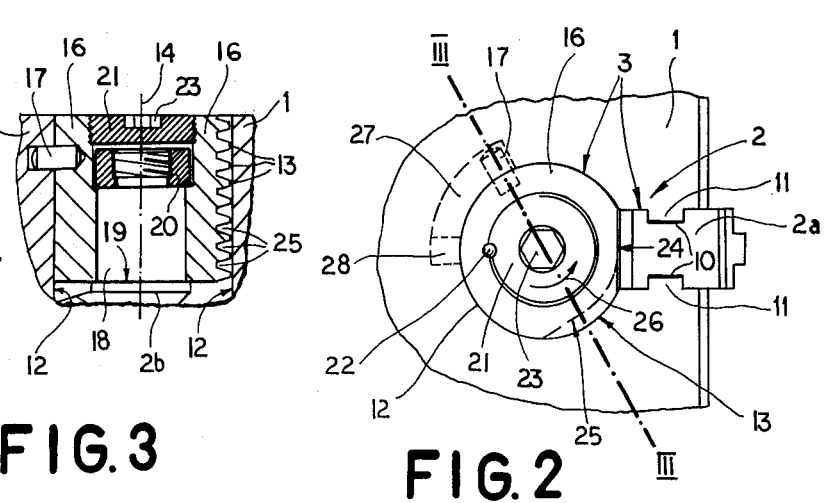
FIG. 4
FIG. 1
FIG. 3
FIG. 2

SPLIT-JAW LATHE CHUCK WITH ROTARY COUPLING MEMBERS

FIELD OF THE INVENTION

The present invention relates to a lathe chuck. More particularly this invention concerns a split-jaw lathe chuck having individually decoupable jaw parts.

BACKGROUND OF THE INVENTION

A standard split-jaw lathe chuck has a chuck body rotatable about an axis and formed with a plurality of angularly spaced and radially extending inner guides and with a plurality of angularly spaced and radially extending outer guides. Respective inner jaw parts are radially displaceable in the inner guides and respective outer jaw parts projecting axially forwardly from the chuck body are radially displaceable in the outer guides. Means including at least one operator engageable with the inner jaw parts can jointly radially displace same in the chuck body in the respective inner guides.

Such an arrangement can be provided with individual coupling members such as described in my copending patent application 886,348 filed Mar. 14, 1978. Such coupling members are each displaceable between an axially advanced coupling position engaging both of the respective jaw parts and coupling same together for joint radial displacement and axially withdrawn decoupling positions for relative radial displacement of the respective parts. Such an arrangement has the considerable advantage that the axial stroke of the operator can be converted, with a considerable mechanical advantage, into a relatively short radial stroke of the inner jaw parts. The outer jaw parts are set so as to be spaced slightly outwardly of the workpiece or tool to be gripped by releasing of the respective coupling members, so that even though the jaw parts have a reduced stroke, they can be set to hold any workpiece whose dimensions lie within a wide range. Furthermore such an arrangement allows outer jaw parts to be exchanged in the manner of jaw blanks for the use of the chuck with custom-made jaw blanks adapted for particular purposes.

It is known to provide such a chuck with a so-called safety ring that prevents displacement of any of the coupling members into the decoupling position except when the inner jaw parts are locked against displacement. This feature avoids a serious accident that can happen when the chuck is rotated at high speed without one of its outer jaw parts being properly secured to the respective inner jaw part. Such a ring has, however, several disadvantages. First of all it is not often convenient to mount a single such ring on a given chuck. Furthermore such a system, as in U.S. Pat. No. 3,682,491, requires the user to decouple all of the inner and outer jaw parts simultaneously, so that one-by-one adjustment of the jaws is impossible. Thus it is impossible for the lathe operator to merely adjust a single one of the jaws without completely unchucking the workpiece.

OBJECTS OF THE INVENTION

It is therefore an object of the present invention to provide an improved lathe chuck.

Another object is the provision of a lathe chuck provided with a safety mechanism that on the one hand prevents actuation of the chuck by the jaw-tightening operating member except when all of the coupling members are in the coupling position yet on the other hand that allows the jaws to be adjusted individually, one after the other.

SUMMARY OF THE INVENTION

These objects are attained according to the instant invention in a lathe chuck of the above-described general type, but wherein the coupling members are rotationally displaceable between the respective coupling and decoupling positions about respective coupler axes extending generally radially of the chuck axis. In addition respective locking members are each operatively engageable between the inner parts and the chuck body for blocking radial displacement of the inner jaw parts except when the respective coupling member is in the coupling position.

With the system according to the instant invention, therefore, when one of the coupling members has been rotated into the decoupling position the chuck will be locked against tightening so that the normally provided limit switch for the lathe will not allow it to start up. Such a limit switch normally prevents operation of the lathe unless the jaws of the chuck have moved inwardly from the radial outermost positions. The provision of such a coupling member and locking element on each of the jaws allows the jaws to be sequentially adjusted, yet prevents operation of the chuck until all of the jaws are locked.

According to further features of this invention the coupling member is a generally cylindrical sleeve rotatable on a pin of the respective inner jaw part. This sleeve is fixed relative to the respective coupler axis axially on the respective inner jaw part, but is rotational thereon about the respective coupler axis. Furthermore each of these coupling members is formed with at least one projection extending radially relative to the respective coupler axis, and is formed angularly offset therefrom with a recessed region. The outer jaw parts are formed with backwardly open recesses in which the projections of the respective coupling members engage in the coupling position. In the decoupling position the recessed region of the coupling members is aligned with the respective outer jaw part so that the projection does not engage the respective outer jaw part. In fact, the coupling members are formed with a plurality of such projections constituted as teeth, and the outer jaw parts are formed with a complementary, but radially longer, array of teeth meshable with the teeth of the respective coupling member. Thus each of the outer jaw parts can assume any of a plurality of offset positions relative to the respective inner jaw part.

According to further features of this invention the locking element may be formed as a projection extending axially backwardly from the sleeve. To this end the chuck body is formed in each of the inner guides with an L-shaped formation or groove having a width corresponding generally to that of the pin. One leg of this groove extends parallel to the respective coupler axis so that the pin can move in it when the respective coupling member is in the coupling position. The other leg extends circumferentially or lies in a plane perpendicular to the respective coupler axis, so that when the respective coupling member is in a preset radial position it can be rotated from the coupling into the decoupling position, but when the respective pin is engaged in this other leg the respective coupling member cannot move toward and away from the chuck axis.

It is also possible according to this invention for the locking element to be displaceable in the chuck body radially of the chuck axis adjacent the respective inner guide. Respective pushers are engaged parallel to the chuck axis between camming surfaces of the coupling members and the locking elements in such a manner that when the respective coupling element is displaced into the decoupling position the pusher cams the respective locking element into a blocking position preventing axial displacement of the operator. When the respective coupling member is in the coupling position, however, a spring urges the respective locking element and the pusher into a position out of the way of the operator and allowing free axial movement thereof.

With the system according to this invention displacement of any of the coupling members into the decoupling position will lock the chuck. Thus accidental starting-up of the lathe when one of the jaws is not properly locked together is possible. Furthermore the use of rotational coupling members ensures that jarring or sudden stops and starts during use of the chuck will not accidentally decouple any of the jaw parts.

BRIEF DESCRIPTION OF THE DRAWING

FIG. 1 is an axial section through a lathe chuck according to this invention;

FIG. 2 is a view taken in the direction of arrow II of FIG. 1;

FIG. 3 is a section taken along the line III—III of FIG. 2;

FIG. 4 is a section taken along line IV—IV of FIG. 1;

SPECIFIC DESCRIPTION

Figure 5:
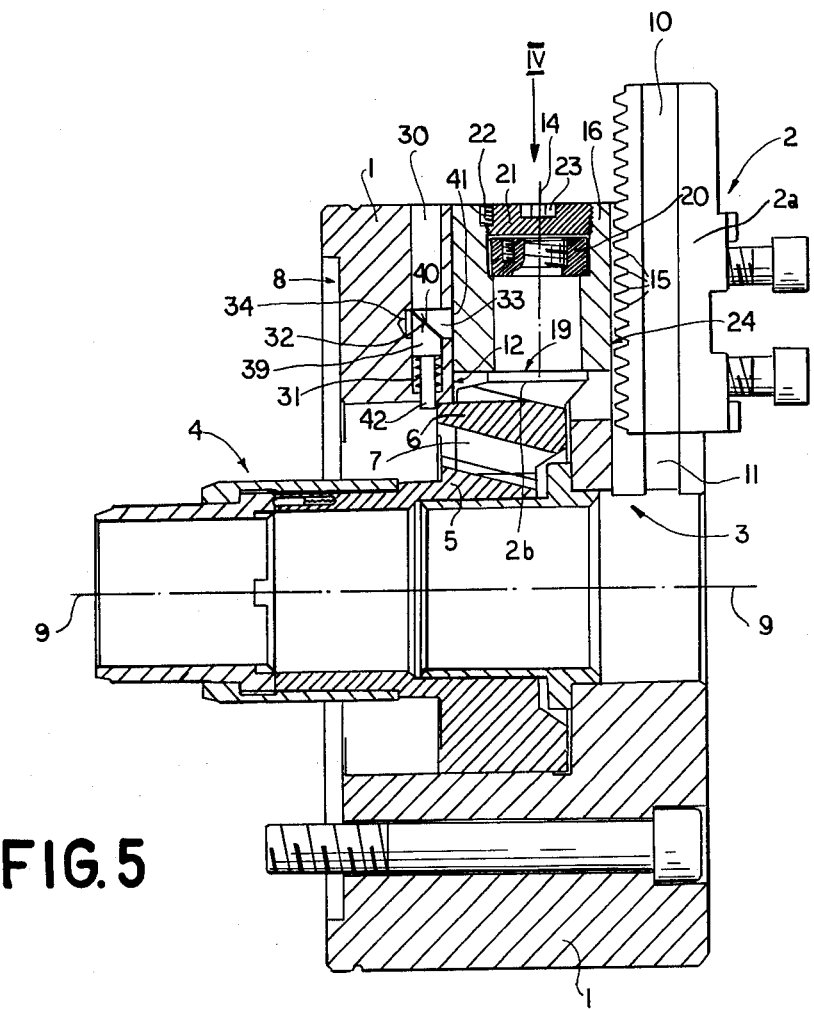
FIG. 5 is an axial section through another chuck according to this invention.

A chuck according to the instant invention has a one-piece chuck body 1 provided with three jaws indicated generally at 2 which are radially displaceable relative to a chuck axis 9 in guides indicated generally at 3. An operator 4 constituted as a sleeve 5 carries wedge hooks 6 engageable with complementary wedge hooks 7 of the jaws 2 to radially displace same. Bolts 36 may secure the body 1 to the headstock of a lathe which will fit within a cylindrical recess 8 at the back face of the body 1.

Each of the jaws 2 has an outer jaw part 2a and an inner jas part 2b. Each part 2a is formed with a pair of radially extending rectangular-section grooves 10 receiving rectangular-section guide ridges 11 of the body 1. Each inner jaw part 2b is received within a respective cylindrical hole 12 centered on an axis 14 extending radially of the axis 9.

Each of the inner jaw parts 2b is further constituted as a pin 18 on which rides a coupling member 16 that is clamped between a shoulder 19 of the respective inner jaw part 2b and a ring 20 screwed over its end and secured by means of a locking screw 37. Thus this coupling member 16 can rotate on the pin 18 of the jaw 2b about the axis 14. Another threaded washer 21 is screwed onto the upper end of the tubular coupling element 16 and similarly locked in place by means of another such locking screw 22. This threaded disk 21 is formed at the axis 14 with an outwardly open hexagonal recess 23 adapted to receive an Allen wrench that can therefore be used to rotate the coupling member 16 about the axis 14.

The coupling member 16 is provided with a pin 17 extending perpendicular to the axis 14 and received in an L-shaped groove 38 formed in the wall of the cylindrical guide hole 12. This L-shaped groove 38 receives the pin 37 in either of two legs 27 or 28. The leg 27 lies in a plane parallel top the axis 9 and perpendicular to the axis 14, so that when the pin 17 is engaged in it the coupling member 16 can be rotated about the axis 14. The leg 28 extends in a plane including the axes 9 and 14, so that when the pin 17 is engaged in it the coupling member 16, and with it the respective inner jaw part 2b, can move axially of the axis 14. To this end, of course, the legs 27 and 28 are of a width only slightly larger than the diameter of the pin 17. The body 1 is formed with a hole 29 extending parallel to the axis 9 and opening at the junction between the legs 27 and 28 to allow insertion of the pin 17 into the coupling member 16.

In addition the coupling member 16 is formed with a flat 24 and, extending from this flat 24, with a plurality of grooves 25 forming teeth 13. Similarly the outer jaw part 2a is formed with an array of teeth 15 along its full length radial of the axis 9. The teeth 13 formed by the groove 25 can mesh with the teeth 15 to radially lock the coupling member 16, and with it the inner jaw part 2b, to the coupling member 2b. The flat 24, when aligned with the teeth 15, allows relative movement of the two parts 2a and 2b. The leg 27 of the groove 38 has an angular width of approximately 60° which allows the coupling member 16 as best seen in FIG. 2 to move between two angularly offset positions, one allowing relative motion as described above and one coupling the two parts 2a and 2b together.

To adjust such a chuck it is necessary first to displace the operating member 4 into a position corresponding to the radial outermost positions of the jaws 2, as illustrated in FIG. 1. In this position an Allen wrench is inserted into the recess 23 of the jaw to be adjusted, and its coupling member 16 is rotated so that the respective pin 17 moves to the blind end of the leg 27 of the groove 38. In this position the flat 24 is aligned with the teeth 5 and the two parts 2a and 2b can be displaced relative to each other. Thus the outer jaw part 2a can be positioned or removed and replaced. During this adjustment, when the pin 17 is engaged in the leg 27, radial displacement of the respective inner jaw part 2b is impossible. This locking of the one inner jaw part similarly prevents axial displacement of the operator 4 so that the chuck cannot be adjusted at all. Since most lathes are provided with a limit switch that prevents the lathe motor from being started until the operator is in a position indicating that the jaws have been moved inwardly from their outermost positions, this will prevent accidental starting-up of the lathe when the jaw parts 2a and 2b of any of the jaws 2 are not coupled together.

Thereafter the Allen wrench is rotated to turn the coupling member 16 in the direction of arrow 26 of FIG. 2 to mesh the teeth 13 and 15 together. This action therefore couples the respective inner and outer jaw parts together, while aligning the pin 17 with the leg 28 to permit radial displacement of the respective inner jaw part 2b. Thus once the respective inner and outer jaws are coupled together the operator 4 is again free to act on all of the inner jaw parts.

Figures 6, 7:
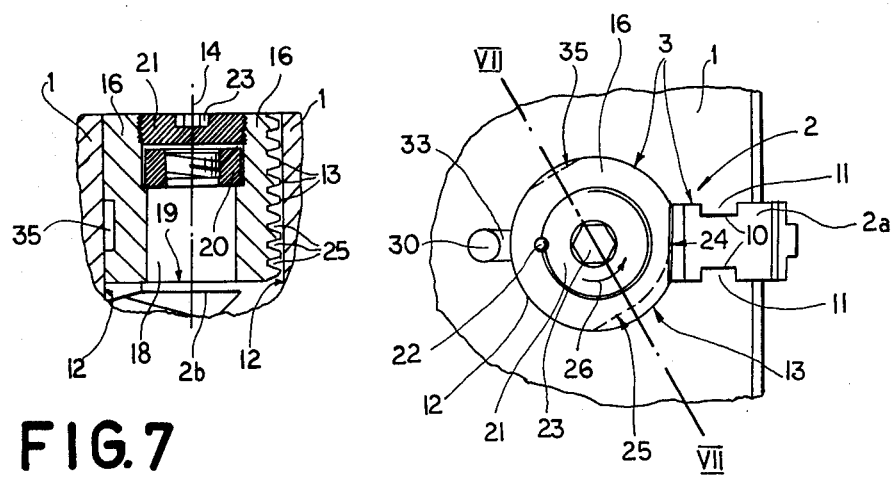
FIG. 6 is a view taken in the direction of arrow VI of FIG. 5.
FIG. 7 is a section taken along line VII—VII of FIG. 6.

In the arrangement of FIGS. 5–7 identical reference numerals refer to functionally and structurally identical parts. Here, however, the pin 17 is replaced with a locking element 39 constituted as a stepped rod received in a radially extending bore 30 in the body 1. A spring 31 urges the locking member 39 radially outwardly. A pusher 33 has a surface 32 extending at an angle of 45° to the axes 9 and 14 and bearing flatly on a similar surface 40 of the locking element 39. This pusher 33 is limitedly axially displaceable in an axial bore 34 of the chuck body 1 and has another end surface 41 bearing radially of the axis 14 on the coupling member 16. A groove or recess 35 is formed in the wall of the coupling member 16 at a location diametrically opposite the teeth 13, so that when the teeth 13 are engaged with the teeth 15 of the respective outer jaw part 2a the pusher 33 will be able to move axially forwardly into this cutout or groove 35 to allow the locking member 39 to move radially slightly outwardly in the bore 30. When the flat 24 is aligned with the teeth 15 of the outer jaw part 2a the pusher 41 will ride on the cylindrical outer surface of the coupling member 16 so that the tip 42 of the locking element 39 will be engaged behind the wedge-hooks 6 of the coupling member 4, preventing its axial displacement in the direction it closes the chuck.

Thus in accordance with the embodiments of FIGS. 5–7 when any of the coupling members 16 is in the decoupling position, its respective locking element will block displacement of the operator 4 to prevent closing of the chuck and starting up of the lathe. In this manner an accident caused by starting the lathe when one of the outer jaw parts 2a is not coupled to the respective inner jaw part 2b is impossible.

I claim:

1. A lathe chuck comprising:
   a chuck body rotatable about a chuck axis and formed with a plurality of angularly spaced and radially extending inner guides and with a plurality of angularly spaced and radially extending outer guides;
   respective inner jaw parts radially displaceable in said body in said inner guides;
   means including at least one operator engageable with said inner jaw parts for radially displacing same in said chuck body in the respective inner guides;
   respective outer jaw parts projecting axially forwardly from said chuck body and radially displaceable therein in said outer guides;
   respective coupling members between said inner jaw parts and the respective outer jaw parts and displaceable rotationally about respective coupler axes generally radial of said chuck axis between coupling positions engaging both of the respective parts and coupling same together for joint radial displacement and angularly offset decoupling positions for relative radial displacement of the respective parts; and
   means including respective locking elements operatively engageable between said inner jaw parts and said chuck body for blocking radial displacement of said inner jaw parts except when the respective coupling member is in said coupling position.

2. The chuck defined in claim 1 wherein said coupling member is a generally cylindrical sleeve rotatable on the respective inner jaw part about the respective coupler axis.

3. The chuck defined in claim 2 wherein said coupling members are each formed with a projection extending radially of the respective coupler axis and angularly offset therefrom relative to the respective coupler axis with a recessed region, said outer jaw parts being formed with axially backwardly open recesses relative to said chuck axis, said projections being engaged in the respective recesses in said coupling positions and said recesses being aligned with the respective recessed regions in said decoupling positions.

4. The chuck defined in claim 3 wherein said coupling members are each formed relative to the respective coupler axes with an array of radially projecting and axially spaced teeth constituting the respective projections, each of said outer jaw parts being formed relative to said chuck axis with axially backwardly projecting and radially spaced teeth meshable with the teeth of the respective coupling member and forming the respective recesses.

5. The chuck defined in claim 3 wherein said coupling members are each formed relative to the respective coupler axes with axially centered polygonal recesses, whereby a wrench can be fitted into said polygonal recesses to rotate said members about the respective coupler axes.

6. The chuck defined in claim 3 wherein said locking elements extend relative to the respective coupler axes radially from the respective coupling members, said chuck body being formed at each inner guide with an L-shaped groove receiving the respective locking element and having relative to the respective coupler axis an axially extending leg along which the respective locking element moves on displacement of the respective inner part radially of said chuck axis and a radially extending leg along which the respective locking element moves on rotation of the respective coupling member only when in a predetermined radial position.

7. The chuck defined in claim 3 wherein said locking elements are each displaceable radially of said chuck axis between a blocking position axially engageable with said operator and a freeing position axially unengageable with said operator.

8. The chuck defined in claim 7 wherein said means for blocking further includes respective pushers displaceable axially relative to said chuck axis and engageable between said inner jaw parts and the respective locking elements, and respective cam formations on said inner jaw parts for pressing said pushers against the respective locking elements for displacement of same into said blocking positions on displacement of said inner jaw parts into said decoupling positions.

9. The chuck defined in claim 8 wherein each of said pushers has an inclined end surface, each of said locking elements having an inclined surface flatly engaging the inclined surface of the respective pusher, said blocking means including springs urging said elements into the freeing position.

* * * * *